United States Patent [19]
Senegas

[11] Patent Number: 5,868,058
[45] Date of Patent: Feb. 9, 1999

[54] LOG MILL BAND-SAW BLADE FOR INITIAL PROCESSING OF TIMBER AND DERIVATIVES THEREOF

[75] Inventor: Christian Senegas, Feurs, France

[73] Assignee: Manufacture Forezienne De Lames De Scies S.A., France

[21] Appl. No.: 931,078

[22] Filed: Sep. 15, 1997

Related U.S. Application Data

[63] Continuation of Ser. No. 513,918, Sep. 6, 1995, abandoned.

[30] Foreign Application Priority Data

Jul. 22, 1993 [FR] France ................... 93 09307

[51] Int. Cl.⁶ .................................................. B23D 57/00
[52] U.S. Cl. ................................. 83/846; 83/835; 83/847; 83/851
[58] Field of Search ............................. 83/846, 847, 851, 83/835

[56] References Cited

U.S. PATENT DOCUMENTS

| | | | |
|---|---|---|---|
| 14,305 | 2/1856 | Coffin | 83/846 |
| 29,688 | 8/1860 | Germann | 83/846 |
| Re. 31,433 | 11/1983 | Clark | 83/846 |
| 1,328,982 | 1/1920 | Calkins . | |
| 1,850,478 | 3/1932 | Schaefer | 83/847 |
| 1,899,212 | 2/1933 | Shortell | 83/846 |
| 2,351,737 | 5/1944 | Blum . | |
| 2,568,870 | 10/1951 | Ronan . | |
| 3,171,457 | 3/1965 | Brown | 83/849 |
| 4,270,429 | 6/1981 | Brown . | |
| 4,557,172 | 12/1985 | Yoneda | 83/848 |
| 4,727,788 | 3/1988 | Yoshida et al. | 83/851 |
| 4,813,324 | 3/1989 | Yoshida et al. | 83/851 |
| 4,827,822 | 5/1989 | Yoshida et al. | 83/835 |
| 4,958,546 | 9/1990 | Yoshida et al. | 83/835 |
| 5,018,421 | 5/1991 | Lucki et al. | 83/835 |
| 5,088,358 | 2/1992 | Emter . | |
| 5,094,135 | 3/1992 | Nakahara et al. | 83/847 |
| 5,410,935 | 5/1995 | Holston et al. | 83/851 |
| 5,501,129 | 3/1996 | Armstrong et al. | 83/851 |
| 5,603,252 | 2/1997 | Hayden, Sr. | 83/851 |
| 5,606,900 | 3/1997 | Stoddard | 83/851 |

FOREIGN PATENT DOCUMENTS

| | | |
|---|---|---|
| 9206000 | of 1992 | Germany . |
| 22929 | of 1914 | United Kingdom . |
| 2113144 | of 1983 | United Kingdom . |
| 2214866 | of 1989 | United Kingdom . |

*Primary Examiner*—M. Rachuba
*Assistant Examiner*—Sean A. Pryor
*Attorney, Agent, or Firm*—Wall Marjama Bilinski & Burr

[57] ABSTRACT

A log band saw blade for primary wood processing, consisting of a series of different modules (M1, M2, M3 . . . ) or identical modules, each including a number of teeth (D) having variable characteristics determined in accordance with all the relevant technical criteria. In each module, the tooth portion located in front of the lowest point has a variable shape (FV) while the tooth portion located therebehind has a constant shape (FC).

11 Claims, 4 Drawing Sheets

5,868,058

LOG MILL BAND-SAW BLADE FOR INITIAL PROCESSING OF TIMBER AND DERIVATIVES THEREOF

This application is a continuation of application Ser. No. 08/513,918, filed Sep. 6, 1995, now abandoned.

BACKGROUND OF THE INVENTION

The invention relates to the initial processing of timber, i.e. all sawmill activities including the cutting up of trunks on a band-saw as well as pick-up of cut lengths.

Currently, band-saw blades for woodworking are made of special cold-rolled hardened strip steel and have various cross sections defined by their width and thickness.

Current technology offers single-cut or double-cut blade or blades with a relieved or constant-pitch tooth pattern over the entire length of the blade for a given cross section.

SUMMARY OF THE INVENTION

Generally speaking, as shown in FIG. 1, toothing is characterized by its shape, the most common shapes being froze teeth, parrot, amstrong, flat bottom, hand saw tooth, and its angles (cutting angle (a), sharpness angle (b), clearance angle (c), its pitch (P) and its depth (f)).

The invention attempts to enhance the performance of such log mill band-saw blades in their application to the initial processing of timber and derivatives thereof, particularly in terms of the removal of chips, cutting forces, vibration, cutting speeds and reliability.

For this purpose and according to a first characteristic, the band-saw blade, in its application to the initial processing of timber, consists of a succession of different or identical modules each comprising several teeth having varying features determined according to all the applicable technical criteria, and in that in each module, the part of the tooth situated in front of the lowest point is of variable shape (FV) and the part of the tooth situated behind is of constant shape (FC).

According to another characteristic, the pitch of the tooth pattern is not constant over the entire length of the blade but has, in each module, a variable increasing or decreasing pitch.

Another characteristic is the fact that each module is determined by a number of teeth, a minimum and maximum pitch and a pitch variation between each tooth.

BRIEF DESCRIPTION OF THE DRAWINGS

These aspects and others will become apparent from the following description.

The object of the present invention is described, merely by way of example, in the accompanying drawings in which.

DESCRIPTION OF THE INVENTION

In order that the present invention may more readily be understood, the following description is given, merely by way of example, reference being made to FIGS. 2 to 10.

The technology for a variable tooth pattern on band-saw blades for cutting up trunks with a view to initial processing of timber can be used in various ways.

Figure 1:
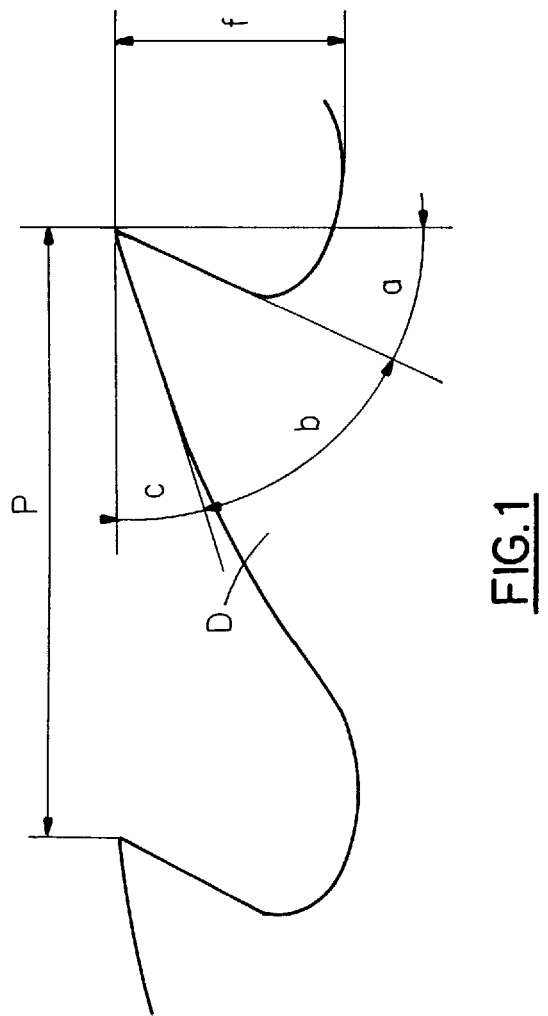
FIG. 1 is a view showing the main characteristics of a saw-blade tooth pattern.
Figure 2:
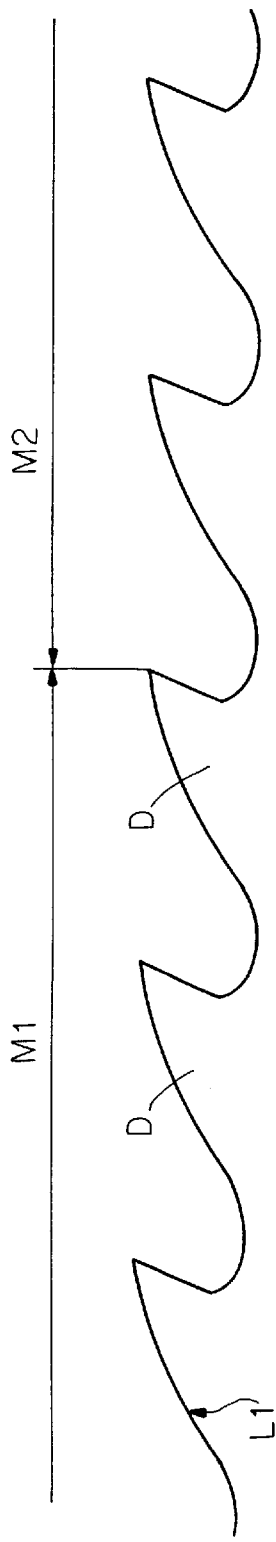
FIGS. 2 to 10 are views showing various embodiments of the tooth pattern according to the invention.

For example, as shown in FIG. 2, the blade (L1) has a certain number of modules (M1, M2 . . . ) that can each have a variable number of teeth (D).

Figure 3:
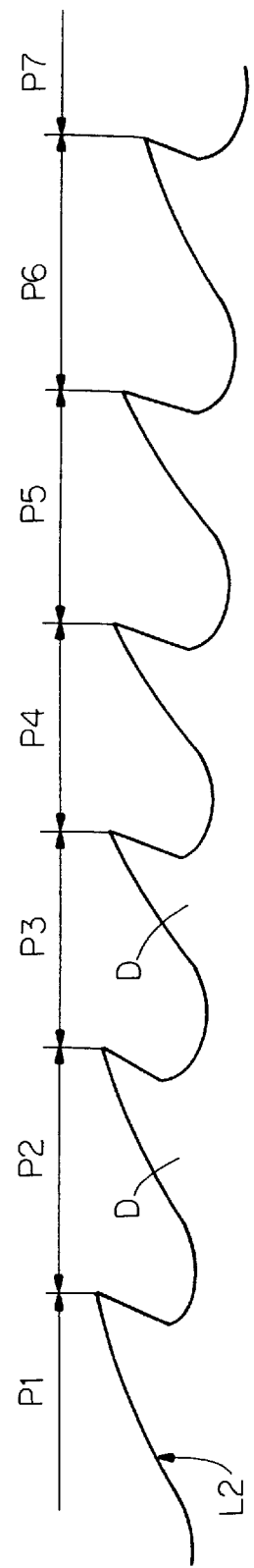

The blade (L2) shown in FIG. 3 has a different pitch (P1, P2, P3, P4, P5, P6, P7, . . . ) between each tooth (D).

Figure 4:
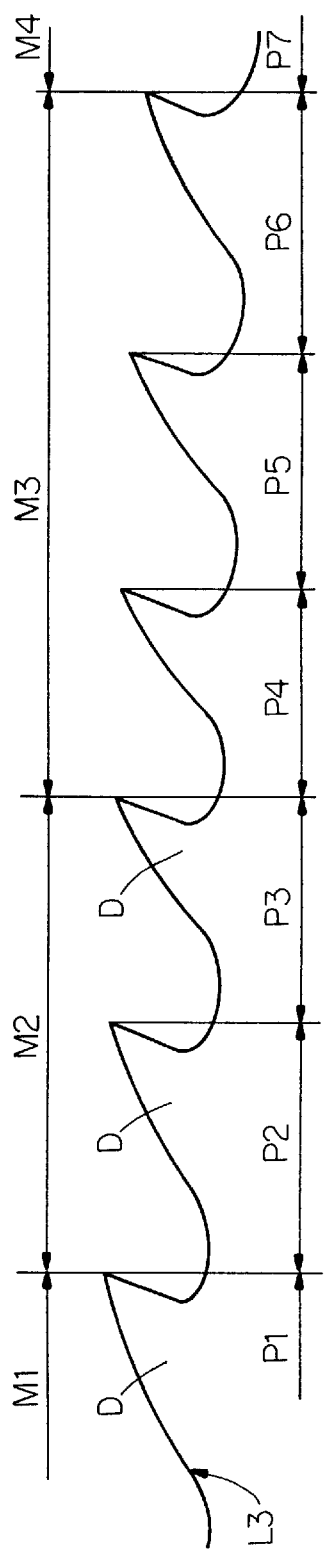

The blade (L3) shown in FIG. 4 combines variable pitches (P1 . . . P7) and variable modules (M1 . . . M4).

Figure 5:
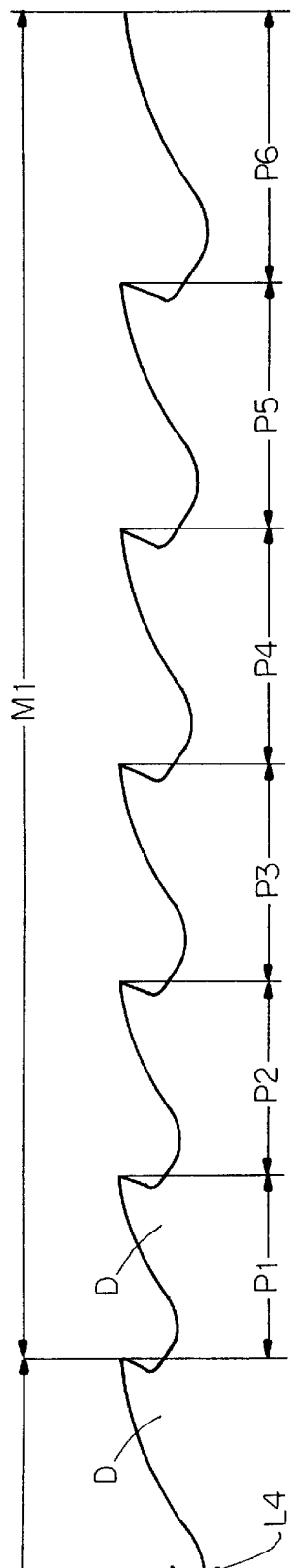

The blade (L4) shown in FIG. 5 consists of several modules (M1, M2 . . . ) each comprising a number of teeth (D) which are of identical shape but which is proportional to the variable pitch of each tooth.

Figure 6:
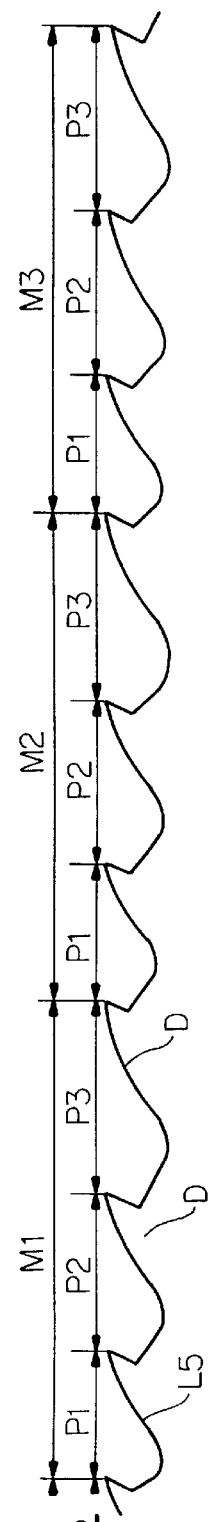

The blade (L5) shown in FIG. 6 consists of a succession of identical modules (M1, M2, M3) over its entire length, it being possible for a module to consist of any of the cases enumerated in this description.

Figure 7:
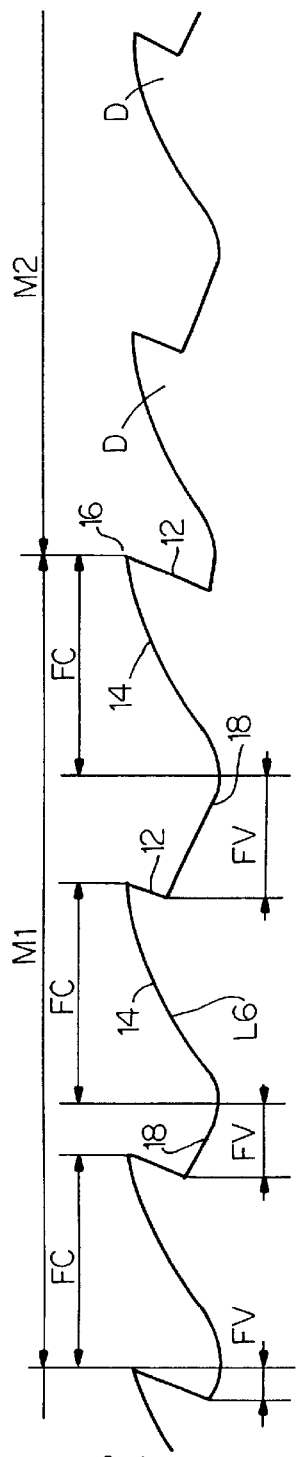

The blade (L6) shown in FIG. 7 has a variable number of teeth per module. The teeth may, as appropriate, be of identical shape but which is proportional to their pitch, of different shape, the shape being the result of a combination of the movement of one or two cams (not shown) forming part of the kinematics of sharpening machines. Generally speaking, and according to the invention the part of the tooth situated in front of the lowest point is of variable shape and variable horizontal dimension (FV) and the part of the tooth situated behind is of constant shape and a constant horizontal dimension (FC). Put another way, and still referring to FIG. 7, each of the adjacently arranged teeth (D) include an angled cutting or rake surface 12, and a contoured relief surface 14 oppositely disposed relative to a tooth tip 16. An offset surface 18 interconnects the rake surface 12 to the relief surface 14 which includes the variable horizontal dimension (FV) as compared to adjacent teeth in the module. The relief surface 14 of each of the teeth has the constant horizontal dimension (FC).

Figure 8:
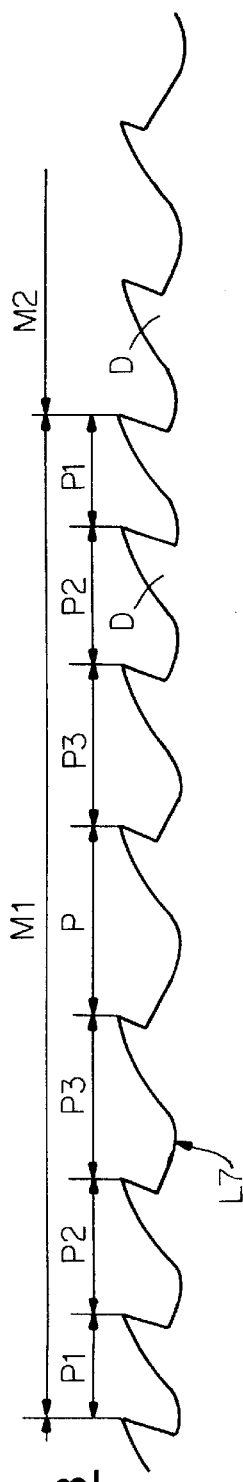

The blade (L7) shown in FIG. 8 consists of several modules with opposite increasing and decreasing teeth or, conversely, teeth of variable or identical shapes which are proportional to their pitch.

Figure 9:
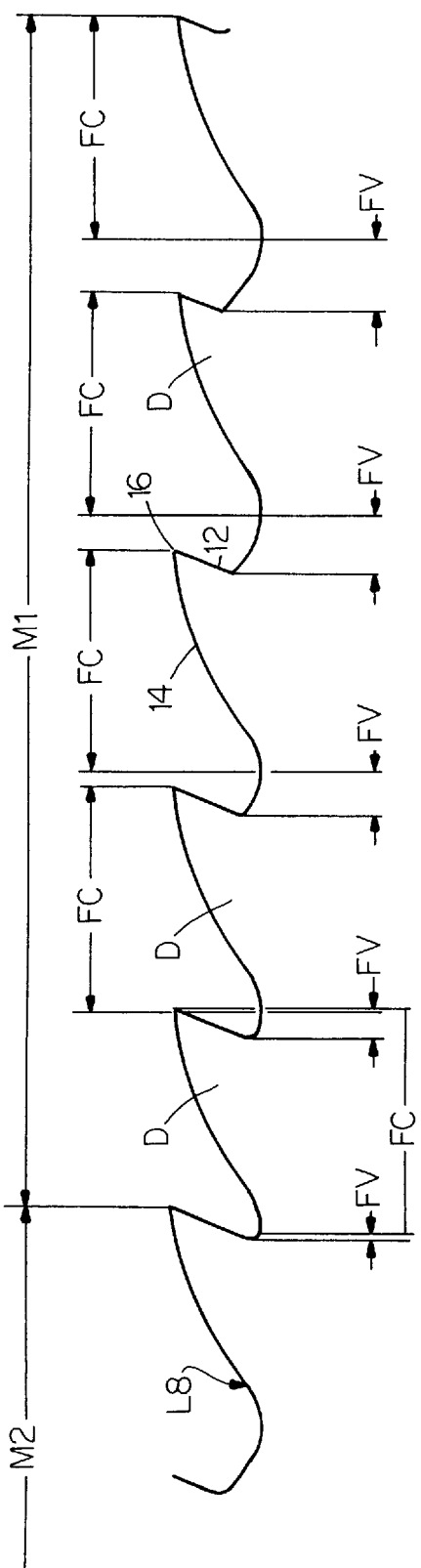

The blade (L8) shown in FIG. 9 consists of several modules with teeth of identical profile and form in a constant shape and horizontal dimension (FC), said teeth being separated from each other by an increasing variable horizontal gap (FV) as shown in the drawings for example.

Figure 10:
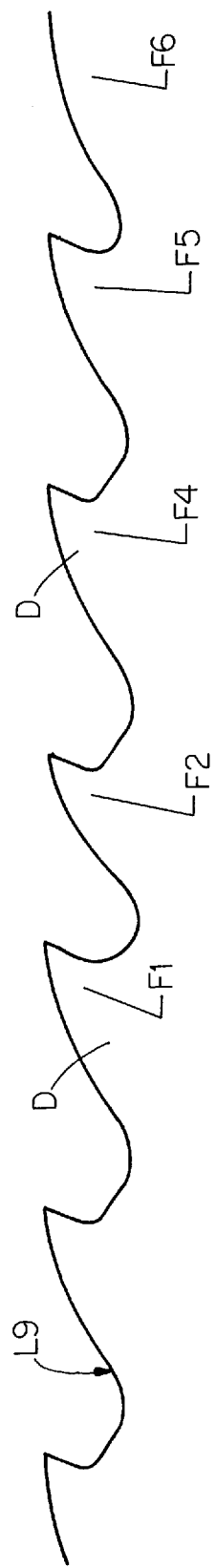

The blade (L9) shown in FIG. 10 has teeth (F1, F2, F4, F5, F6) of different shape and profile.

Each module includes a certain number of teeth, the pitch of the tooth pattern can be constant, decreasing or increasing. When determining the module(s), the pitches of the teeth are adjusted so that the overall length of the blade is equivalent to that of a standard blade for band-saws.

Determination of the module takes into account various technical criteria such as species of timber, lengths of timber, the sawing and sharpening equipment used, the type of blades used (stellite, swagged, with carbide tips, etc.).

The advantages are clearly apparent from the description and the following factors are emphasized in the application in question:

improved chip removal: in fact, the variation of pitch makes it possible to form chips of differing thicknesses, thus facilitating their fragmentation and removal, improved cutting forces due to variation of the pitch from one tooth to another within the same module because the forces are directly proportional to the thickness of the chips, the vibrational excitation mode of the blade is modified. The continuous excitation that occurs in a constant-pitch blade is "broken" by the variation in pitch, force and excitation frequency, improved transverse and longitudinal strength of the blade which allows higher sawing speeds, deeper infeeds and greater convenience for the user, the significant reliability of the saw blade which is not subjected to forces as high as those encountered by a conventional blade, a factor which minimizes sharpening and replacements and therefore improves efficiency, modifying the excitation mode of the blade also results in a significant noise reduction during sawing.

I claim:

1. A log-mill band-saw blade for initial timber processing, said blade comprising at least one module, each said module including a plurality of adjacently arranged saw teeth, each said tooth having a substantially vertical rake surface, a curved relief surface oppositely disposed from said rake surface relative to a tooth tip, and a curved offset surface connecting each curved relief surface with a rake surface of a succeeding tooth, in which the intersection of the curved relief surface and the curved offset surface defines the lowest point of said tooth which extends beneath the lowest point of said rake surface and wherein each of said curved relief surfaces has a constant horizontal dimension defined by an identical contour, and at least some of said curved offset surfaces in said module have a variable horizontal dimension and a variable contour.

2. A log mill band-saw blade as recited in claim 1, in which at least one said module includes a tooth pattern having a variable pitch from tooth to tooth, said pitch increasing along one direction of said pattern and decreasing along a second opposite direction.

3. A log mill band-saw blade as recited in claim 2, wherein the pitch variation between teeth in said tooth pattern increases and decreases proportionally in said respective directions.

4. A log mill band-saw blade as recited in claim 2, wherein the pitches of said blade is adjusted to allow said blade to have a length dimension equivalent to that of a standard band-saw blade.

5. A log mill band-saw blade as recited in claim 1, having a plurality of modules, each module of said plurality consisting of a tooth pattern containing a variable number of teeth.

6. A log mill band-saw blade as recited in claim 1, having a plurality of modules, each said module consisting of a variable number of different shaped teeth.

7. A log mill band-saw blade as recited in claim 1, including a plurality of modules, each said module consisting of a variable number of teeth having varying shape and pitch.

8. A log mill band-saw blade as recited in claim 1, including a plurality of modules, in which adjacent modules contain teeth patterns which oppositely increase and decrease in size.

9. A log mill band-saw blade as recited in claim 1, including a plurality of modules, in which at least one said module includes a tooth pattern having a plurality of teeth having various shapes, and in which each of said various shaped teeth include pitches which are proportional to each tooth shape.

10. A log mill band saw-blade as recited in claim 1, including at least one module wherein each said module includes a plurality of teeth of identical shape, and in which the plurality of teeth include shape parameters which are proportional to their pitch.

11. A log mill band-saw blade as recited in claim 1, wherein at least one module includes teeth having different shapes, in which the shapes of said teeth are the result of a combination of camming elements that are the part of kinematics of sharpening machines.

\* \* \* \* \*